US007206614B2

(12) United States Patent
Kortum et al.

(10) Patent No.: US 7,206,614 B2
(45) Date of Patent: Apr. 17, 2007

(54) PHONE ADAPTER METHOD AND SYSTEM FOR VEHICLES

(75) Inventors: Philip T. Kortum, Austin, TX (US); Marc A. Sullivan, Austin, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

(21) Appl. No.: 11/332,127

(22) Filed: Jan. 13, 2006

(65) Prior Publication Data

US 2006/0116177 A1 Jun. 1, 2006

Related U.S. Application Data

(63) Continuation of application No. 10/799,164, filed on Mar. 12, 2004, now Pat. No. 7,016,709.

(51) Int. Cl.
*H04Q 7/20* (2006.01)

(52) U.S. Cl. ............................... 455/569.1; 455/569.2; 455/557; 379/167.13; 379/142.13

(58) Field of Classification Search ............. 455/569.1, 455/569.2, 556.1, 557, 572, 573; 379/142.13, 379/167.13
See application file for complete search history.

(56) References Cited

U.S. PATENT DOCUMENTS

| | | | | |
|---|---|---|---|---|
| 5,479,479 | A | 12/1995 | Braitberg et al. | |
| 5,535,274 | A | 7/1996 | Braitberg et al. | |
| 5,779,205 | A | 7/1998 | Ching | |
| 5,822,427 | A | 10/1998 | Braitberg et al. | |
| 5,974,334 | A | 10/1999 | Jones, Jr. | |
| 6,112,103 | A * | 8/2000 | Puthuff | 455/557 |
| 6,246,766 | B1 | 6/2001 | Walsh | |
| 6,304,764 | B1 | 10/2001 | Pan | |
| 6,341,218 | B1 | 1/2002 | Poplawsky et al. | |
| 6,411,823 | B1 | 6/2002 | Chen | |
| 6,920,313 | B2 * | 7/2005 | Trombatore | 455/74.1 |
| 2002/0082058 | A1 | 6/2002 | Baratono et al. | |
| 2002/0086716 | A1 | 7/2002 | Pan | |
| 2002/0197954 | A1 | 12/2002 | Schmitt et al. | |
| 2003/0013501 | A1 | 1/2003 | Malhotra | |
| 2003/0013504 | A1 | 1/2003 | Park et al. | |
| 2003/0032459 | A1 | 2/2003 | Kim | |
| 2003/0109290 | A1 | 6/2003 | Moffi et al. | |

* cited by examiner

*Primary Examiner*—Congvan Tran
(74) *Attorney, Agent, or Firm*—Brooks Kushman P.C.

(57) ABSTRACT

A system includes sleeves each being removably receivable, one at a time, by an adapter connectable to an appliance operable for enabling a user to communicate hands-free on a phone when the phone is connected to the appliance. The sleeves are differently configured from one another to respectively receive, one at a time, phones having configurations which correspond to the configurations of the sleeves. One of the sleeves connects a phone to the appliance via the adapter when the phone is received by the sleeve while the sleeve is received by the adapter while the adapter is connected to the appliance.

20 Claims, 2 Drawing Sheets

PHONE ADAPTER METHOD AND SYSTEM FOR VEHICLES

CROSS-REFERENCE TO RELATED APPLICATIONS

This application is a continuation of U.S. application Ser. No. 10/799,164, filed Mar. 12, 2004, now U.S. Pat. No. 7,016,709.

BACKGROUND OF THE DISCLOSURE

1. Field of the Disclosure

The present disclosure relates generally to a mobile phone adapter for vehicles.

2. Background Art

It is desirable for mobile phone users to conduct telephone calls in their vehicles using hands-fee devices. Currently, mobile phone users have a few options for using hands-free devices in order to make telephone calls from their vehicles. One option is for the users to use vehicles having fully integrated cell phones such as provided by the OnStar® hands-free system. Another option is for the users to install mobile phone specific hands-free kits in their vehicles. Another option is for the users to use cigarette lighter adapter kits in their vehicles.

Each of these options have disadvantages. For example, the built-in cell phone system (i.e, the OnStar® hands-free system) precludes the use of the users' own mobile phone providers and mobile phones. As such, users are required to pay substantially higher rates for air time. Further, this built-in system cannot be removed from vehicles. Accordingly, the built-in cell phone is mobile only as long as a user is in a vehicle having the built-in system.

The mobile phone specific hands-free kits allow users to pick their own mobile phone providers and allow the users to remove their mobile phones from the vehicles. However, these kits are generally expensive to install in vehicles and mar the interior of the vehicles. Further, these kits only function with compatible mobile phones. For example, these kits only function with the mobile phones of a certain mobile phone provider. Furthermore, the hands-free capabilities of the mobile phones are only available in the vehicle in which the compatible mobile phone specific hands-free kit is installed.

The cigarette lighter adapter kits have the advantage of portability. However, the insertion and removal of a mobile phone is somewhat difficult and the quality of the reception and transmission can be quite poor due to the poor integration with the vehicle. Dialing capabilities are not provided and the microphones of the kits are, by necessity, in mounts which are frequently far from the users when the users are in the vehicles.

Thus, there exists a need for a universal mobile phone adapter system integrated into a vehicle in which the system allows a user to use any one of a plurality of mobile phones in a hands-free manner in the vehicle.

BRIEF DESCRIPTION OF THE DRAWINGS

The present disclosure is pointed out with particularity in the appended claims. However, other features of the present disclosure will become more apparent, and the present disclosure will be best understood by referring to the following detailed description in conjunction with the accompanying drawings in which:

DETAILED DESCRIPTION OF THE DISCLOSURE

Figure 1:
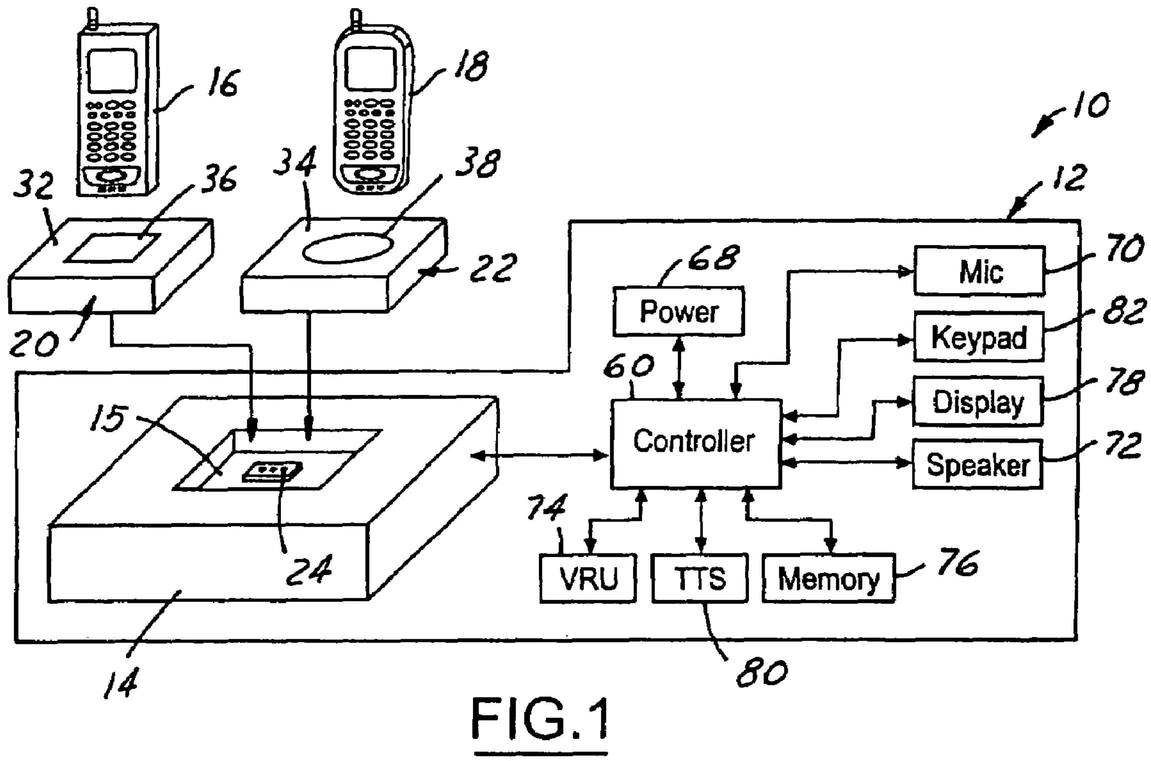
FIG. 1 illustrates a block diagram of a universal mobile phone adapter system for use in a vehicle in accordance with the present disclosure.

The present disclosure discloses a system having an adapter, a first sleeve, and a second sleeve. The adapter is connectable to an appliance operable for enabling a user to communicate hands-free on a phone when the phone is connected to the appliance. The sleeves are removably receivable by the adapter one at a time. The first sleeve removably receives a first phone. The second sleeve has a configuration different than the first sleeve to removably receive a second phone having a configuration different than the first phone. The first phone connects to the appliance when the first sleeve receives the first phone, the adapter receives the first sleeve, and the adapter connects to the appliance. The second phone connects to the appliance when the second sleeve receives the second phone, the adapter receives the second sleeve, and the adapter connects to the appliance.

The present disclosure also discloses a method which includes connecting adapter to an appliance operable for enabling a user to communicate hands-free on a phone when the phone is connected to the appliance. The method further includes inserting a first sleeve into the adapter such that the first sleeve is connected to the appliance via the adapter, and inserting a first phone into the first sleeve such that the first phone is connected to the appliance via the first sleeve and the adapter. The method further includes removing the first phone and the first sleeve from the adapter. The method further includes inserting a second sleeve having a configuration different than the first sleeve into the adapter such that the second sleeve is connected to the appliance via the adapter. The method further includes inserting a second phone having a configuration different than the first phone such that the second phone is connected to the appliance via the second sleeve and the adapter.

The present disclosure further discloses a system which includes a plurality of sleeves each removably receivable, one at a time, by an adapter connectable to an appliance operable for enabling a user to communicate hands-free on a phone when the phone is connected to the appliance. The sleeves are differently configured from one another to respectively receive, one at a time, phones having configurations which correspond to the configurations of the sleeves. One of the sleeves connects a phone to the appliance via the adapter when the phone is received by the sleeve while the sleeve is received by the adapter while the adapter is connected to the appliance.

The present disclosure further discloses a method which includes providing a plurality of sleeves which are differently configured from one another to respectively receive, one at a time, phones having configurations which correspond to the configurations of the sleeves. The method includes enabling a user to communicate hands-free on a phone when the phone is connected to an appliance via a sleeve received by an adapter while the adapter is connected to the appliance. The method further includes connecting a phone to the appliance when one of the sleeves receives the phone while the sleeve is received by the adapter while the adapter is connected to the appliance.

The present disclosure also discloses a system which includes an adapter, a first sleeve, and a second sleeve. The adapter is connectable to an appliance operable for enabling a user to communicate hands-free on a phone when the phone is connected to the appliance. The adapter has a sleeve receiver for removably receiving one at a time a sleeve having a given base. The first and second sleeves each has the given base. The first sleeve further has a first phone receiver for removably receiving a first phone having a first physical body configuration and a first electrical interface configuration. The first phone connects to the appliance when the first phone is received by the first phone receiver of the first sleeve, the first sleeve is received by the sleeve receiver of the adapter, and the adapter is connected to the appliance. The second sleeve further has a second phone receiver different than the first phone receiver for removably receiving a second phone having a second physical body configuration and a second electrical interface configuration different than the first physical body configuration and the first electrical interface configuration. The second phone connects to the appliance when the second phone is received by the second phone receiver of the second sleeve, the second sleeve is received by the sleeve receiver of the adapter, and the adapter is connected to the appliance.

Referring now to FIG. 1, a block diagram of a universal mobile phone adapter system 10 in accordance with the present disclosure is shown. System 10 is for use with a vehicle (not shown) and includes a vehicle appliance 12 integrated into the vehicle. Vehicle appliance 12 includes a universal vehicle adapter base 14 that is also integrated into the vehicle. In general, system 10 allows a vehicle user such as the vehicle driver to take any one of a plurality of differently sized and configured mobile phones 16 and 18 at a time and use the selected mobile phone in a hands-free manner in the vehicle.

System 10 is for use with a corresponding vehicle of a plurality of vehicles. Thus, each vehicle has a respective system 10. Adapter bases 14 of vehicle appliances 12 are identical in size and design. The design of adapter base 14 is generally rectangular block-sized and the size of the adapter base is generally large enough to support the adapter base and components inserted therein during use of a vehicle. Each adapter base 14 serves as universal mobile phone connection point to the corresponding vehicle.

Adapter base 14 has a block-sized cavity 15 sized to removably receive one of a plurality of adapter sleeves such as adapter sleeves 20 and 22. Each adapter sleeve 20 and 22 has a block-sized design complementary to the block-sized design of cavity 15. Each adapter sleeve 20 and 22 respectively fits into cavity 15 in order to be mechanically connected to adapter base 14. Cavity 15 of adapter base 14 may receive one of adapter sleeves 20 and 22 at a time. An adapter sleeve such as adapter sleeve 20 may be removed from cavity 15 of adapter base 14 in order to allow another adapter sleeve such as adapter sleeve 22 to be inserted into the cavity of the adapter base.

Figures 2A, 2B, 2C:
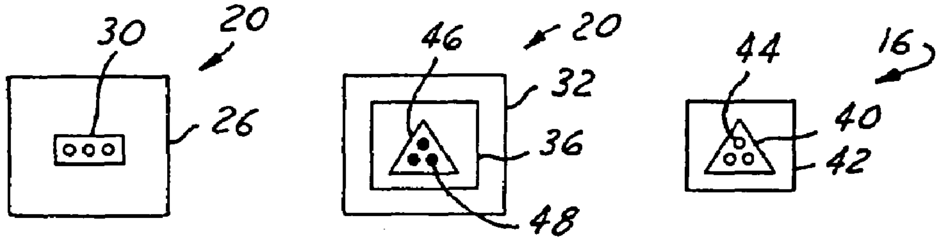
FIGS. 2A and 2B respectively illustrate plan views of the bottom and top surfaces of a first adapter sleeve for use with a first cell phone and the adapter base of the universal mobile phone adapter system.
FIG. 2C illustrates a plan view of the bottom surface of the first mobile phone.
Figures 3A, 3B, 3C:
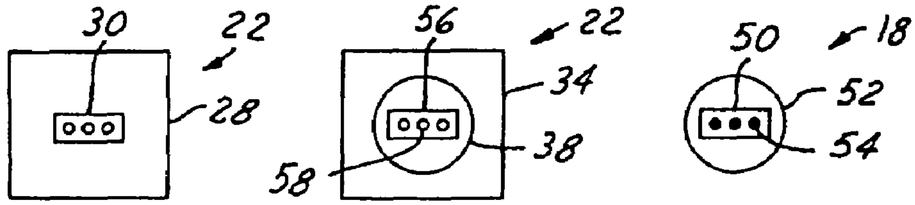
FIGS. 3A and 3B respectively illustrate plan views of the bottom and top surfaces of a second adapter sleeve for use with a second cell phone and the adapter base of the universal mobile phone adapter system.
FIG. 3C illustrates a plan view of the bottom surface of the second mobile phone.

Adapter base 14 includes an electrical plug connector 24 within cavity 15. Adapter sleeves 20 and 22 each include respective bottom surface 26 and 28 having an electrical plug connector 30 (see FIGS. 2A and 3A). Electrical plug connector 30 mates with electrical plug connector 24 of adapter base 14 when the corresponding adapter sleeve 20 or 22 is inserted into the adapter base in order to electronically connect the corresponding adapter sleeve and the adapter base.

Adapter sleeves 20 and 22 each correspond with a respective mobile phone 16 and 18. Adapter sleeves 20 and 22 are used to electrically connect the respective mobile phones 16 and 18 to adapter base 14. As such, each adapter sleeve 20 and 22 is for use with one mobile phone having a given size and a given electrical plug configuration. Adapter sleeves 20 and 22 generally transform the sizes and electrical plug configurations of mobile phones 16 and 18 to be compatible with adapter base 14. Accordingly, by way of adapter sleeves 20 and 22, a plurality of differently sized and configured mobile phones may be used with adapter base 14. Because adapter base 14 has an identical design and size with respect to the adapter bases of other vehicles, a given sized and configured mobile phone may be used with different vehicles by way of the adapter base and one of adapter sleeves 20 and 22.

Adapter sleeves 20 and 22 each include respective top surfaces 32 and 34. Top surfaces 32 and 34 each include a respective cavity 36 and 38 (also see FIGS. 2B and 3B). Cavities 36 and 38 of adapter sleeves 20 and 22 have different configurations and sizes with respect to one another. The configuration and sizes of cavities 36 and 28 of adapter sleeves 20 and 22 are different from one another in order to accommodate and removably receive differently configured and sized mobile phones 16 and 18.

For example, cavity 36 of adapter sleeve 20 has a block-sized configuration to accommodate and removably receive mobile phone 16 therein. That is, mobile phone 16 generally has a block-styled body sized to fit within cavity 36 of adapter sleeve 20. Mobile phone 16 also has an electrical plug connector 40 having, as an example, a triangular shape on a bottom surface 42 of the mobile phone (see FIG. 2C). Plug connector 40 includes, as an example, three female electrical connectors 44. Female connectors 44, when connected to corresponding connectors, are for use to generally transmit and receive phone signals, status signals, power signals, etc., between mobile phone 16 and vehicle appliance 12 via adapter sleeve 20 and adapter base 14. Correspondingly, cavity 36 of adapter sleeve 20 has a complementary electrical plug connector 46 having a triangular shape (see FIG. 2B). Plug connector 46 includes three male electrical connectors 48 for receiving the female connectors 44 of mobile phone 16.

When mobile phone 16 is inserted into cavity 36 of adapter sleeve 20 the mobile phone 16 is mechanically connected to adapter sleeve 20. Further, plug connector 40 of mobile phone 16 and plug connector 46 of adapter sleeve 20 connect with one another in order to electronically connect the mobile phone 16 and adapter sleeve 20. Plug connector 46 of adapter sleeve 20 is electronically interconnected to plug connector 30 located on bottom surface 26 of the adapter sleeve. Adapter sleeve 20 includes internal electronics which electrically interconnect plug connectors 30 and 46 such that mobile phone 16 and vehicle appliance 12 electrically communicate with one another via plug connectors 40, 46, and 30 when the mobile phone 16 is inserted into adapter sleeve 20 and the adapter sleeve 20 is inserted into adapter base 14.

Adapter sleeve 20 with mobile phone 16 inserted therein are removable from adapter base 14 as one piece. Mobile phone 16 is also removable from adapter sleeve 20 when the adapter sleeve is inserted or removed from adapter base 14. Accordingly, if desired, the user removes mobile phone 16 from adapter sleeve 20 and adapter base 14 in order to take the mobile phone out from the vehicle. When entering the vehicle, the user re-inserts mobile phone 16 into adapter sleeve 20 and inserts the adapter sleeve into adapter base 14 (if the adapter sleeve is not already inserted into the adapter base) in order to use mobile phone 16 in conjunction with system 10. If desired, instead of using the mobile phone 16 and adapter sleeve 20 combination, the user inserts the mobile phone 18 and adapter sleeve 22 into adapter base 14 combination in order to use the mobile phone 18 with system 10. Mobile phone 18 is also removable from adapter sleeve 22 when the adapter sleeve 22 is inserted or removed from adapter base 14.

As another example of the different configurations and sizes of cavities 36 and 38 of adapter sleeves 20 and 22 with respect to one another, cavity 38 of adapter sleeve 22 has a circular-sized configuration to accommodate and receive mobile phone 18 therein. That is, mobile phone 18 generally has a circular-styled body sized to fit within cavity 38 of adapter sleeve 22. Mobile phone 18 also has an electrical plug connector 50 having, as an example, a rectangular shape on a bottom surface 52 of the mobile phone (see FIG. 3C). Plug connector 50 includes, as an example, three male electrical connectors 54. Male connectors 54 are for use to generally transmit and receive phone signals, status signals, power signals, etc., between mobile phone 18 and vehicle appliance 12 via adapter sleeve 22 and adapter base 14. Correspondingly, cavity 38 of adapter sleeve 22 has a complementary electrical plug connector 56 having a rectangular shape (see FIG. 3B). Plug connector 56 includes three female electrical connectors 58 for receiving the male connectors 54 of mobile phone 18.

When mobile phone 18 is inserted into cavity 38 of adapter sleeve 22 the mobile phone 18 is mechanically connected to adapter sleeve 22. Further, plug connector 50 of mobile phone 18 and plug connector 56 of adapter sleeve 22 connect with one another in order to electronically connect the mobile phone 18 and adapter sleeve 22. Plug connector 56 of adapter sleeve 22 is electronically interconnected to plug connector 30 located on bottom surface 26 of the adapter sleeve. Adapter sleeve 22 also includes internal electronics which electrically interconnect plug connectors 30 and 56 such that mobile phone 18 and vehicle appliance 12 can electrically communicate with one another via plug connectors 50, 56, and 30 when the mobile phone 18 is inserted into adapter sleeve 22 and the adapter sleeve 22 is inserted into adapter base 14.

Accordingly, one mobile phone and adapter sleeve combination may be inserted into adapter base 14 at a time in order to electronically connect the mobile phone to vehicle appliance 12 in order to enable a user of the vehicle to use the mobile phone in a hands-free manner during a phone call. For example, the mobile phone 16 and adapter sleeve 20 combination may be inserted into adapter base 14 in order to electronically connect the mobile phone 16 to vehicle appliance 12. At another time, the mobile phone 18 and adapter sleeve 22 combination may be inserted into adapter base 14 in order to electronically connect the mobile phone 18 to vehicle appliance 12.

Mobile phone 16 (or mobile phone 18) is electronically connected to vehicle appliance 12 in order to enable hands-free use of the mobile phone 16 when a user is making a phone call. To this end, adapter base 14 is connected to a controller 60 of vehicle appliance 12. Controller 60 generally communicates with mobile phone 16 via adapter base 14 and adapter sleeve 20 and controls the overall operation of the elements of system 10. Controller 60 is connected to a vehicle power supply 68 to receive and provide power to the elements of system 10.

Vehicle appliance 12 includes a microphone 70 for receiving voice communications of the user. Microphone 70 is connected to controller 60 and is positioned within the vehicle to be near to the user. For instance, microphone 70 is positioned on the rear view mirror to be near the front vehicle passengers. As such, in order to talk on mobile phone 16 the user talks into microphone 70 instead of talking into the microphone of mobile phone 16 which is supported in adapter base 14. Microphone 70 transfers the user's voice communications to controller 60. In turn, controller 60 transfers the voice communications to mobile phone 16 via adapter base 14 and adapter sleeve 20 for transmission to the telephone of the party with whom the user is communicating during the phone call.

Vehicle appliance 12 includes a speaker 72 such as one of the vehicle's radio speakers. Speaker 72 is also connected to controller 60. Controller 60 controls speaker 72 to output the other party's voice communications received by mobile phone 16 during the phone call between the other party and the user. That is, controller 60 receives the other party's voice communications from mobile phone 16 via adapter base 14 and adapter sleeve 20 and then transfers these voice communications to speaker 72 for the user to hear. As such, the user hears the other party's voice communications by way of speaker 72 instead of listening to the speaker of mobile phone 16.

Vehicle appliance 12 includes a voice recognition module (VRU) 74 connected to controller 60. VRU 74 is operable to translate user's voice commands received by microphone 70 into signals which are useable by controller 60. For example, VRU 74 translates the user's voice command "dial" into a corresponding command signal for use by controller 60. Similarly, VRU 74 translates numeric characters spoken by the user into corresponding signals for controller 60. In response to such voice commands, controller 60 controls the operation of mobile phone 16 accordingly.

Vehicle appliance 12 includes memory 76 connected to controller 60. Memory 76 generally stores telephone number information in a phonebook directory like a phonebook directory of mobile phone 16. Such information may include a listing of names and associated telephone numbers. Controller 60 accesses memory 76 and the memory of mobile phone 16 to obtain such information and to write such information to the both memories.

Vehicle appliance 12 includes a display 78 for displaying information to the user. Controller 60 controls display 78 to display the same type of information which is displayed on mobile phone 16 when the mobile phone 16 is in use while connected to adapter base 14.

Controller 60 includes a voice synthesizer (not shown) which generates electronic voice signals in response to corresponding electrical signals generated by the controller during operation of system 10. The voice synthesizer is connected to speaker 72 in order to output voice signals for the user to hear. For example, such outputted electronic voice signals may be "Dialing Phil" when mobile phone 16 is dialing Phil's telephone number. Vehicle appliance 12 also includes a text-to-speech (TTS) module 80. Controller 60 controls TTS module 80 to convert text messages received by mobile phone 16 into speech for output over speaker 72 with the use of the voice synthesizer.

Vehicle appliance 12 includes a keypad 82 (i.e., dialing pad) which is connected to controller 60. Keypad 82 is positioned in the vehicle to be accessible and within reach of the user. For instance, keypad 82 is positioned in the dashboard of the vehicle. Keypad 82 generally includes typical mobile phone buttons such as a numerical set of keys and the like and is generally functional to recognize dialing activity. As such, the user dials a telephone number using keypad 82 instead of manipulating the buttons of mobile phone 16 in order to make a phone call. In turn, controller 60 recognizes the dialing activity on keypad 82 and instructs mobile phone 16 to function accordingly. Controller 60 also controls display 78 to display the dialing activity (e.g., dialed numbers) of keypad 82 for the user to see.

Figure 4:
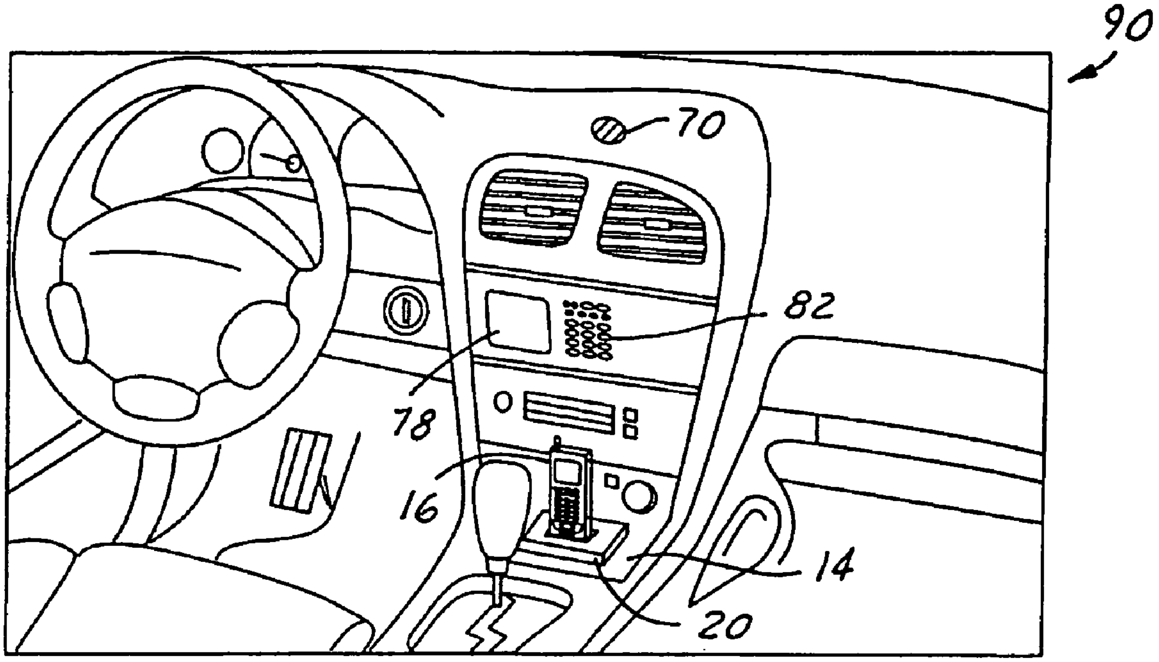
FIG. 4 illustrates a vehicle interior having a sample vehicle installation point of the adapter base of the universal mobile phone adapter system.

Referring now to FIG. 4, a vehicle interior 90 having a sample vehicle installation point of adapter base 14 is shown. Vehicle interior 90 is an example of where adapter base 14 as well as microphone 70, display 78, and keypad 82 are positioned within the interior of the vehicle for access by the user.

The illustrations of embodiments described herein are intended to provide a general understanding of the structure of various embodiments, and they are not intended to serve as a complete description of all the elements and features of methods and apparatuses that might make use of the structures described herein. Many other embodiments will be apparent to those of skill in the art upon reviewing the above description. Other embodiments may be used and derived therefrom, such that structural and logical substitutions and changes may be made without departing from the scope of this disclosure. The Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term “invention” merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:

an adapter connectable to an appliance operable for enabling a user to communicate hands-free on a phone when the phone is connected to the appliance;

first and second sleeves each being removably receivable by the adapter one at a time, the first sleeve removably receives a first phone, the second sleeve has a configuration different than the first sleeve to removably receive a second phone having a configuration different than the first phone;

wherein the first phone connects to the appliance when the first sleeve receives the first phone, the adapter receives the first sleeve, and the adapter connects to the appliance;

wherein the second phone connects to the appliance when the second sleeve receives the second phone, the adapter receives the second sleeve, and the adapter connects to the appliance.

2. The system of claim 1 wherein:

the adapter has a connector, and the sleeves each have a complementary connector;

wherein the adapter connector and the complementary connector of the first sleeve interconnect to connect the first sleeve to the appliance when the adapter receives the first sleeve while connected to the appliance;

wherein the adapter connector and the complementary connector of the second sleeve interconnect to connect the second sleeve to the appliance when the adapter receives the second sleeve while connected to the appliance.

3. The system of claim 2 wherein:

the first sleeve has a first connector which connects to a connector of the first phone when the first sleeve receives the first phone to connect the first phone to the first sleeve and thereby connect the first phone to the appliance when the adapter receives the first sleeve while connected to the appliance.

4. The system of claim 3 wherein:

the second sleeve has a second connector different than the first connector of the first sleeve, the second connector connects to a connector of the second phone when the second sleeve receives the second phone to connect the second phone to the second sleeve and thereby connect the second phone to the appliance when the adapter receives the second sleeve while connected to the appliance.

5. The system of claim 1 wherein the appliance includes a microphone for inputting voice communications from the user when a phone is connected to the appliance to enable the user to talk hands-free on the phone, wherein:

a phone receives voice communications inputted to the microphone by the user, from the appliance, for transmission to another party during a phone call between the user and the other party when the phone is connected to the appliance.

6. The system of claim 1 wherein the appliance includes a speaker for outputting voice communications to the user when a phone is connected to the appliance to enable the user to listen hands-free on the phone, wherein:

a phone transmits voice communications received from another party during a phone call between the user and the other party, to the appliance, when the phone is connected to the appliance for the appliance to output over the speaker for the user to hear.

7. The system of claim 1 wherein the appliance includes a keypad, wherein:

a phone connected to the appliance is controlled in accordance with dialing activity of the keypad.

8. The system of claim 1 wherein the appliance includes a display, wherein:

activity of a phone connected to the appliance is displayed on the display.

9. The system of claim 1 wherein the appliance includes a power supply, wherein:

a phone connected to the appliance receives power from the power supply of the appliance.

10. A method comprising:

connecting an adapter to an appliance operable for enabling a user to communicate hands-free on a phone when the phone is connected to the appliance;

inserting a first sleeve into the adapter such that the first sleeve is connected to the appliance via the adapter;

inserting a first phone into the first sleeve such that the first phone is connected to the appliance via the first sleeve and the adapter;

removing the first phone and the first sleeve from the adapter;

inserting a second sleeve having a configuration different than the first sleeve into the adapter such that the second sleeve is connected to the appliance via the adapter; and inserting a second phone having a configuration different than the first phone such that the second phone is connected to the appliance via the second sleeve and the adapter.

11. The method of claim 10 wherein:

removing the first phone and the first sleeve from the adapter further comprises removing the first phone from the first sleeve;

the method further comprising removing the second phone and the second sleeve from the adapter; reinserting the first sleeve into the adapter such that the first sleeve is connected to the appliance via the first sleeve and the adapter; and reinserting the first phone into the first sleeve such that the first phone is connected to the appliance via the first sleeve and the adapter.

12. A system comprising:

a plurality of sleeves each being removably receivable, one at a time, by an adapter connectable to an appliance operable for enabling a user to communicate hands-free on a phone when the phone is connected to the appliance;

wherein the sleeves are differently configured from one another to respectively receive, one at a time, phones having configurations which correspond to the configurations of the sleeves;

wherein one of the sleeves connects a phone to the appliance via the adapter when the phone is received by the sleeve while the sleeve is received by the adapter while the adapter is connected to the appliance.

13. The system of claim 12 wherein:

each sleeve is configured such that the sleeve only receives phones, one at a time, which have the configuration corresponding to the configuration of the sleeve.

14. A method comprising:

providing a plurality of sleeves which are differently configured from one another to respectively receive, one at a time, phones having configurations which correspond to the configurations of the sleeves;

enabling a user to communicate hands-free on a phone when the phone is connected to an appliance via a sleeve received by an adapter while the adapter is connected to the appliance; and connecting a phone to the appliance when one of the sleeves receives the phone while the sleeve is received by the adapter while the adapter is connected to the appliance.

15. A system comprising:

an adapter connectable to an appliance operable for enabling a user to communicate hands-free on a phone when the phone is connected to the appliance, the adapter having a sleeve receiver for removably receiving one at a time a sleeve having a given base;

a first sleeve having the given base, the first sleeve further having a first phone receiver for removably receiving a first phone having a first physical body configuration and a first electrical interface configuration;

wherein the first phone connects to the appliance when the first phone is received by the first phone receiver of the first sleeve, the first sleeve is received by the sleeve receiver of the adapter, and the adapter is connected to the appliance;

a second sleeve having the given base, the second sleeve further having a second phone receiver different than the first phone receiver for removably receiving a second phone having a second physical body configuration and a second electrical interface configuration different than the first physical body configuration and the first electrical interface configuration;

wherein the second phone connects to the appliance when the second phone is received by the second phone receiver of the second sleeve, the second sleeve is received by the sleeve receiver of the adapter, and the adapter is connected to the appliance.

16. The system of claim 15 wherein:

the sleeve receiver of the adapter has a connector, and the sleeves each have a complementary connector;

wherein the connector of the sleeve receiver of the adapter and the complementary connector of the first sleeve interconnect to connect the first sleeve to the appliance when the sleeve receiver of the adapter receives the first sleeve while the adapter is connected to the appliance;

wherein the connector of the sleeve receiver of the adapter and the complementary connector of the second sleeve interconnect to connect the second sleeve to the appliance when the sleeve receiver of the adapter receives the second sleeve while the adapter is connected to the appliance.

17. The system of claim 15 wherein:

the first sleeve has a first connector which connects to a connector of the first phone when the first sleeve receives the first phone to connect the first phone to the first sleeve and thereby connect the first phone to the appliance when the sleeve receiver of the adapter receives the first sleeve while the adapter is connected to the appliance.

18. The system of claim 17 wherein:

the second sleeve has a second connector different than the first connector of the first sleeve, the second connector connects to a connector of the second phone when the second sleeve receives the second phone to connect the second phone to the second sleeve and thereby connect the second phone to the appliance when the sleeve receiver of the adapter receives the second sleeve while the adapter is connected to the appliance.

19. The system of claim 15 wherein the appliance includes a keypad, wherein:

a phone connected to the appliance is controlled in accordance with dialing activity of the keypad.

20. The system of claim 15 wherein the appliance includes a display, wherein:

activity of a phone connected to the appliance is displayed on the display.

* * * * *